(12) United States Patent
Lin et al.

(10) Patent No.: US 12,513,319 B2
(45) Date of Patent: Dec. 30, 2025

(54) END-TO-END INSTANCE-SEPARABLE SEMANTIC-IMAGE JOINT CODEC SYSTEM AND METHOD

(71) Applicant: SHANGHAI JIAO TONG UNIVERSITY, Shanghai (CN)

(72) Inventors: Weiyao Lin, Shanghai (CN); Shizhan Liu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 307 days.

(21) Appl. No.: 18/465,240

(22) Filed: Sep. 12, 2023

(65) Prior Publication Data

US 2024/0171761 A1    May 23, 2024

(51) Int. Cl.
| | |
|---|---|
| G06T 9/00 | (2006.01) |
| H04N 19/124 | (2014.01) |
| H04N 19/13 | (2014.01) |
| H04N 19/132 | (2014.01) |
| H04N 19/136 | (2014.01) |
| H04N 19/147 | (2014.01) |
| H04N 19/182 | (2014.01) |
| H04N 19/196 | (2014.01) |
| H04N 19/42 | (2014.01) |
| H04N 19/463 | (2014.01) |

(52) U.S. Cl.
CPC .......... *H04N 19/42* (2014.11); *H04N 19/124* (2014.11); *H04N 19/13* (2014.11); *H04N 19/132* (2014.11); *H04N 19/136* (2014.11); *H04N 19/147* (2014.11); *H04N 19/182* (2014.11); *H04N 19/196* (2014.11); *H04N 19/463* (2014.11)

(58) Field of Classification Search
CPC .... H04N 19/124; H04N 19/13; H04N 19/132; H04N 19/147; H04N 19/196; H04N 19/91; H04N 19/44; G06T 9/002
See application file for complete search history.

(56) References Cited

PUBLICATIONS

M. Akbari, J. Liang and J. Han, "DSSLIC: Deep Semantic Segmentation-based Layered Image Compression," ICASSP 2019—2019 IEEE International Conference on Acoustics, Speech and Signal Processing (ICASSP), Brighton, UK, 2019, pp. 2042-2046, doi: 10.1109/ICASSP.2019.8683541. (Year: 2019).*
S. Duan, H. Chen and J. Gu, "JPD-SE: High-Level Semantics for Joint Perception-Distortion Enhancement in Image Compression," in IEEE Transactions on Image Processing, vol. 31, pp. 4405-4416, 2022, doi: 10.1109/TIP.2022.3180208. (Year: 2022).*

* cited by examiner

*Primary Examiner* — Siamak Harandi
*Assistant Examiner* — Jaspreet Kaur
(74) *Attorney, Agent, or Firm* — CBM PATENT CONSULTING, LLC

(57) ABSTRACT

An end-to-end instance-separable semantic-image joint compression system and method, comprising: image encoder and decoder, mask encoder and decoder, union encoder, embedding extraction module, semantic graph encoder and decoder, entropy coding module, union entropy model, image entropy model and mask entropy model. This invention can fully utilize the redundancy between images and their semantics (including instance masks, bounding boxes, categories and relationships) to improve rate-distortion performance; at the same time, this invention allows instances to be independently coded, facilitating the decoder side to retrieve the semantics and image of a specific object.

9 Claims, 7 Drawing Sheets

END-TO-END INSTANCE-SEPARABLE SEMANTIC-IMAGE JOINT CODEC SYSTEM AND METHOD

CROSS-REFERENCE TO RELATED APPLICATIONS

This application claims priority to Chinese Patent Application Ser. No. CN2022114544871 filed on 21 Nov. 2022.

TECHNICAL FIELD

The present invention relates to a technology in the field of image compression, specifically to a joint codec system and method for image and its semantics that allows for separate encoding and decoding of a specific instance in an image.

BACKGROUND TECHNOLOGY

Most existing compression technologies compress image and its semantics independently, resulting in significant redundancy between them that remains unexploited. The joint compression of image and its semantics can exploit such redundancy to improve the overall compression ratio, and save the computational cost of repeatedly extracting semantics from images in applications such as real-time movie special effects. Moreover, applications like virtual group photos often only necessitate specific object-related parts of the image and its semantics, while most existing methods can only retrieve the object part after fully decoding all the information, leading to unnecessary computation and transmission costs. Consequently, there is a pressing need for a method that can support an instance-separable codec, thus alleviate the burden of computation, transmission and storage.

BRIEF DESCRIPTION OF INVENTION

To address the limitations of existing technologies, which fail to fully utilize the redundancy between images and their semantics and lack support for instance-separable compression, this invention proposes an end-to-end instance-separable semantic-image joint compression system and method. The redundancy between images and their semantics (including instance masks, bounding boxes, categories, and relationships) is exploited to improve rate-distortion performance. At the same time, this invention allows instances to be independently coded, facilitating the decoder side to retrieve the semantics and image of a specific object.

This invention is implemented through the following technical steps:

This invention relates to an end-to-end instance-separable semantic-image joint compression system, comprising: image encoder and decoder, mask encoder and decoder, union encoder, embedding extraction module, semantic graph encoder and decoder, entropy coding module, union entropy model, image entropy model and mask entropy model. Specifically, the image encoder takes the instance image as input and uses a neural network with 16 times spatial downsampling to obtain image representations; The mask encoder takes the instance mask as input and uses a neural network with 16 times spatial downsampling to obtain mask representations; The union encoder takes both image representations and mask representations as inputs, and uses a neural network with spatial downsampling of 4 times to obtain union representations; The embedding extraction module takes union representations as input and uses a neural network with channel dimensionality reduction of 128 times to obtain the union embedding of instance image and mask. The union embeddings of all instances are quantized and embedded into a semantic graph; The semantic graph encoder and decoder compress and recover the semantic graph losslessly, respectively; The union entropy model takes union embeddings as input and uses a neural network with channel dimensionality increased by 128 times to estimate the probability distribution of the union representation of each instance; The mask entropy model takes the union representation as input and uses a neural network with a spatial dimensionality increase of 4 times to estimate the probability distribution of the mask representation; The image entropy model estimates the probability distribution of the image representation using the semantic graph, the union representation and the mask representation as inputs; The entropy coding module encodes the corresponding representations based on the probability estimated by the entropy model, and obtains their respective bitstreams.

The semantic graph is constructed with nodes and edges, where: nodes within the graph represent instances in the image, and their features include instance bounding boxes, categories, and union embeddings outputted by the embedding extraction module; edges in the graph represent relationships between different instances.

This invention relates to a joint encoding method based on the aforementioned system, comprising the following steps:

Step 1) Semantics including instance masks, bounding boxes, and relations are first extracted from the input image. According to the extracted bounding boxes and instance masks, the whole image is separated into instance images. Then, the representations of instance images and masks are extracted through the image encoder and mask encoder, and input into the union encoder to obtain semantic-image union representations; The embedding extraction module downsamples and quantizes the union representation into a union embedding, and embeds it into the semantic graph.

The image and mask representations are obtained through the following way: $y_I=IE(x_I)$, $y_M=ME(x_M)$, where $x_I$ and $x_M$ are instance image and mask, respectively. IE is the image encoder, ME is the mask encoder, $y_I$ and $y_M$ are representations of the image and mask, respectively. $x_I \in R^{3 \times H \times W}$, $x_M \in R^{1 \times H \times W}$, $$y_I \in R^{C \times \frac{H}{16} \times \frac{W}{16}}, y_M \in R^{\frac{C}{3} \times \frac{H}{16} \times \frac{W}{16}}.$$

The union representation is obtained through the following way: $z=UE(cat(y_I, y_M))$, where $cat(\bullet)$ is concatenation on channels, $UE(\bullet)$ is the union encoder and $z \in$ $$R^{C \times \frac{H}{64} \times \frac{W}{64}}$$

is the union representation.

The union embedding is obtained by: $e=q(SE(z))$, where $SE(\bullet)$ is the embedding extraction module, $q(\bullet)$ is quantization, $$e \in R^{\frac{C}{128} \times \frac{H}{64} \times \frac{W}{64}}$$

is the union embedding.

Step 2) Encode the semantic graph and various representations to obtain bitstreams, including:
① Input the semantic graph into the semantic graph encoder for lossless compression, obtaining the semantic graph bitstream;
② Extract instance union embeddings from the semantic graph, input them into the union entropy model to estimate the probability distribution of union representations, and then entropy encode quantized union representations to obtain the union stream;
③ Input the quantized union representation into the mask entropy model to estimate the probability distribution of the mask representation, and then entropy encode the quantized mask representation to obtain the mask bitstream; Input the semantic graph, quantized union representation and quantized mask representation into the image entropy model to estimate the probability distribution of the image representation. Then, entropy encoding is performed on the quantized image representation to obtain the image bitstream. In this way, lossy image and mask compression are achieved.

When lossless mask compression is required, the mask representation needs to be input into the mask decoder to obtain the probability estimation of the instance mask. Then entropy encoding is performed on the mask itself to obtain the mask residual bitstream.

The union entropy estimation performed by the union entropy model is: $\mu_2, \sigma_2 = \text{EntropyEstimate}_2(e)$, $\hat{p}(\hat{z}) \sim N(\mu_2, \sigma_2^2)$, where e is the union embedding of an instance, $\hat{z}$ is the quantized union representation, $\text{EntropyEstimate}_2$ is the union entropy model, $\mu_2, \sigma_2$ are parameters of Gaussian distribution. The Gaussian distribution constructed based on $\mu_2, \sigma_2$ is used to estimate the probability of the quantized union representation, namely, $\hat{p}(\hat{z})$.

The mask entropy estimation performed by the mask entropy model is: $\mu_1^M, \sigma_1^M = \text{EntropyEstimate}_1^M(\hat{z})$, $\hat{p}(\widehat{y_M}) \sim N(\mu_1^M, (\sigma_1^M)^2)$, where $\widehat{y_M}$ is the quantized mask representation, $\text{EntropyEstimate}_1^M$ is the mask entropy model, $\mu_1^M, \sigma_1^M$ are parameters of Gaussian distribution. The Gaussian distribution constructed based on $\mu_1^M, \sigma_1^M$ is used to estimate the probability of quantized mask representation, namely, $\hat{p}(\widehat{y_M})$.

When instance masks are compressed losslessly, the quantized mask representation of each instance is input into the mask decoder to obtain a probability estimate of the mask: $p_0^M, p_1^M = \text{MD}(\widehat{y_M})$, where MD is the mask decoder, $p_0^M$ and $p_1^M$ are the binary probability estimation of the mask and are used to entropy encode the mask itself.

The image entropy estimation performed by the image entropy model is: $\mu_1^I, \sigma_1^I = \text{EntropyEstimate}_1^I(c, \hat{z}, \hat{y}_M)$, $\hat{p}(\hat{y}_I) \sim N(\mu_1^I, (\sigma_1^I)^2)$, where c is the object category, $\text{EntropyEstimate}_1^I$ is the image entropy model, $\mu_1^I, \sigma_1^I$ are parameters of Gaussian distribution. The Gaussian distribution constructed based on $\mu_1^I, \sigma_1^I$ is used to estimate the probability of quantized image representation, namely, $\hat{p}(\hat{y}_I)$.

This invention relates to a decoding method based on the aforementioned joint encoding method, comprising the following steps:

Step i) The semantic graph decoder is first exploited to decode the semantic graph bitstream, losslessly recovering the semantic graph. Then the union entropy model takes the union embedding in the semantic graph as input to entropy decode the union bitstream, outputting the quantized union representation. The mask entropy model takes the quantized union representation as input to entropy decode the mask bitstream, outputting the quantized mask representation. Finally, the image entropy model takes the semantic graph, the quantized union representation and the quantized mask representation as input to entropy decode the image bitstream, outputting the quantized image representation.

Step ii) To reconstruct the image, the image decoder takes the quantized image representation of each instance as input and outputs the instance image. Different instance images are mapped into the correct position in the image plane to restore the original image. To reconstruct instance masks, the mask decoder takes the quantized mask representation of each instance as input and outputs the binary probability distribution of the instance mask. The instance mask is losslessly recovered by entropy decoding the mask residual bitstream, according to the estimated binary probability distribution.

The said instance image mapping is performed by multiplying the reconstructed instance image with the instance mask, and place it back in its cropped position. Specifically, assuming there are totally n instances in the image, and $\{\widehat{x_I^1}, x_M^1\}, \{\widehat{x_I^2}, x_M^2\}, \ldots, \{\widehat{x_I^n}, x_M^n\}$ are reconstructed instance images and masks corresponding to the $1^{st}$, $2^{nd}, \ldots, n^{th}$ instance of the image, where $\widehat{x_I^i} \in \mathbb{R}^{3 \times h_i \times w_i}$, $x_M^i \in \mathbb{R}^{1 \times h_i \times w_i}$. Use $\text{bbox}_i = (x_B^i, y_B^i, w_i, h_i)$, $i=1, 2, \ldots, n$ to denote the bounding box of the $i^{th}$ instance, where $x_B^i, y_B^i, w_i, h_i$ are coordinates of the bounding box. Use $\otimes$ to denote pixel-level multiplication, then the operation can be expressed as: $\hat{x}_I[:, y_B^i: y_B^i+h_i, x_B^i: x_B^i+w_i] = \hat{x}_I[:, y_B^i: y_B^i+h_i, x_B^i: x_B^i+w_i] + \widehat{x_I^i} \otimes x_M^i$, where $\hat{x}_I \in \mathbb{R}^{3 \times H \times W}$ is a zero image initially. After the instance image mapping done, $\hat{x}_I$, is the reconstructed whole image.

The said neural network is trained through loss functions including image reconstruction loss, mask residual bit rate loss, image bit rate loss, mask bit rate loss, union bit rate loss, and semantic graph bit rate loss. Specifically, $$L = \lambda \cdot \text{MSE}(x_I, \hat{x}_I) - \log p_{x_M|p_0,p_1}(x_M|p_0,p_1) - \log p_{\hat{y}_I|\hat{p}(\hat{y}_I)}(\hat{y}_I|\hat{p}(\hat{y}_I)) - \log p_{\widehat{y_M}|\hat{p}(\widehat{y_M})}(\widehat{y_M}|\hat{p}(\widehat{y_M})) - \log p_{\hat{z}|\hat{p}(\hat{z})}(\hat{z}|\hat{p}(\hat{z})) - \log p_{g|\hat{p}(g)}(g|\hat{p}(g))$$

where λ is the Laplacian multiplier used to balance bit rate and image reconstruction quality. The first term in the loss function is image reconstruction loss, while the second is mask residual bit rate loss, the third is image bit rate loss, the forth is mask bit rate loss, the fifth is union bit rate loss, and the last is semantic graph bit rate loss.

For semantic extraction, this invention uses but not limited to 'Mask R-CNN' to extract instance masks from input images. Manually annotated instance masks can also be used. The object bounding boxes are obtained based on instance masks. This invention uses but not limited to 'USGG' (Kaihua Tang et al. 'Unbiased Scene Graph Generation From Biased Training' 2020 IEEE/CVF Conference on Computer Vision and Pattern Recognition) to extract instance relationships.

This invention uses but not limited to the network structure in 'Variational Image Compression with a Scale Hyperprior' for the image encoder and decoder, and uses but not limited to the image encoder and decoder in 'Learned Image Compression with Discretized Gaussian Mixture Likelihoods and Attention Modules' for the mask encoder and decoder.

The semantic graph encoder and decoder are implemented by the method described in the patent document No. CN114095033A 'Context based Graph Convolution Object Interaction Kripke semantics Semantic Lossless Compression System and Method'.

Technology Effect

This invention proposes an end-to-end instance-separable semantic-image joint compression system and method, which can fully utilize the redundancy between images and their semantics such as instance masks, bounding boxes. It greatly improves rate-distortion performance compared to existing methods that perform compression for images and semantics independently. Meanwhile, this invention allows instances to be independently coded, facilitating the decoder side to retrieve the semantics and image of a specific object.

DETAILED DESCRIPTION OF THE INVENTION

Figure 1:
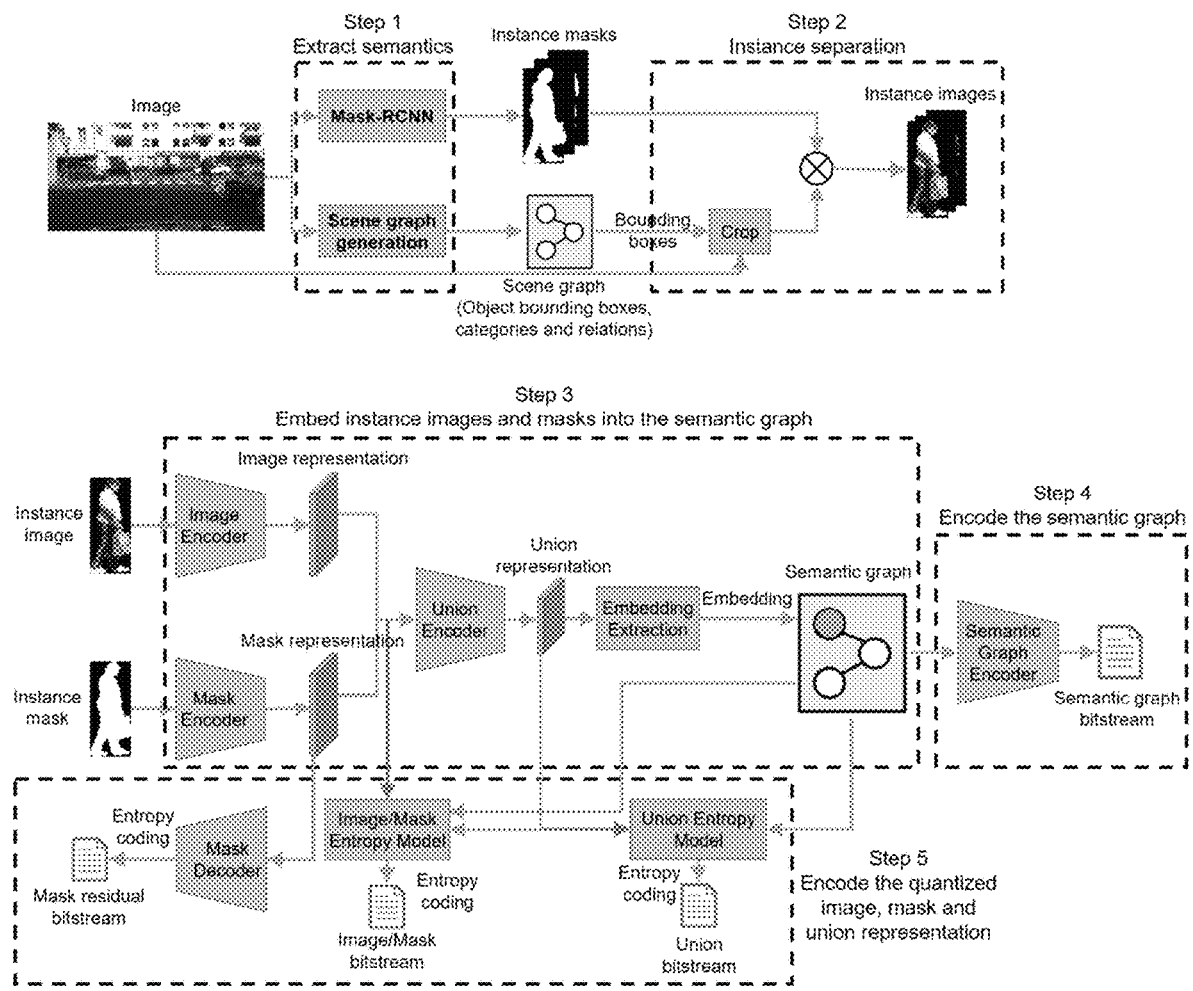
FIG. 1 is the encoding diagram of this invention.
Figure 2:
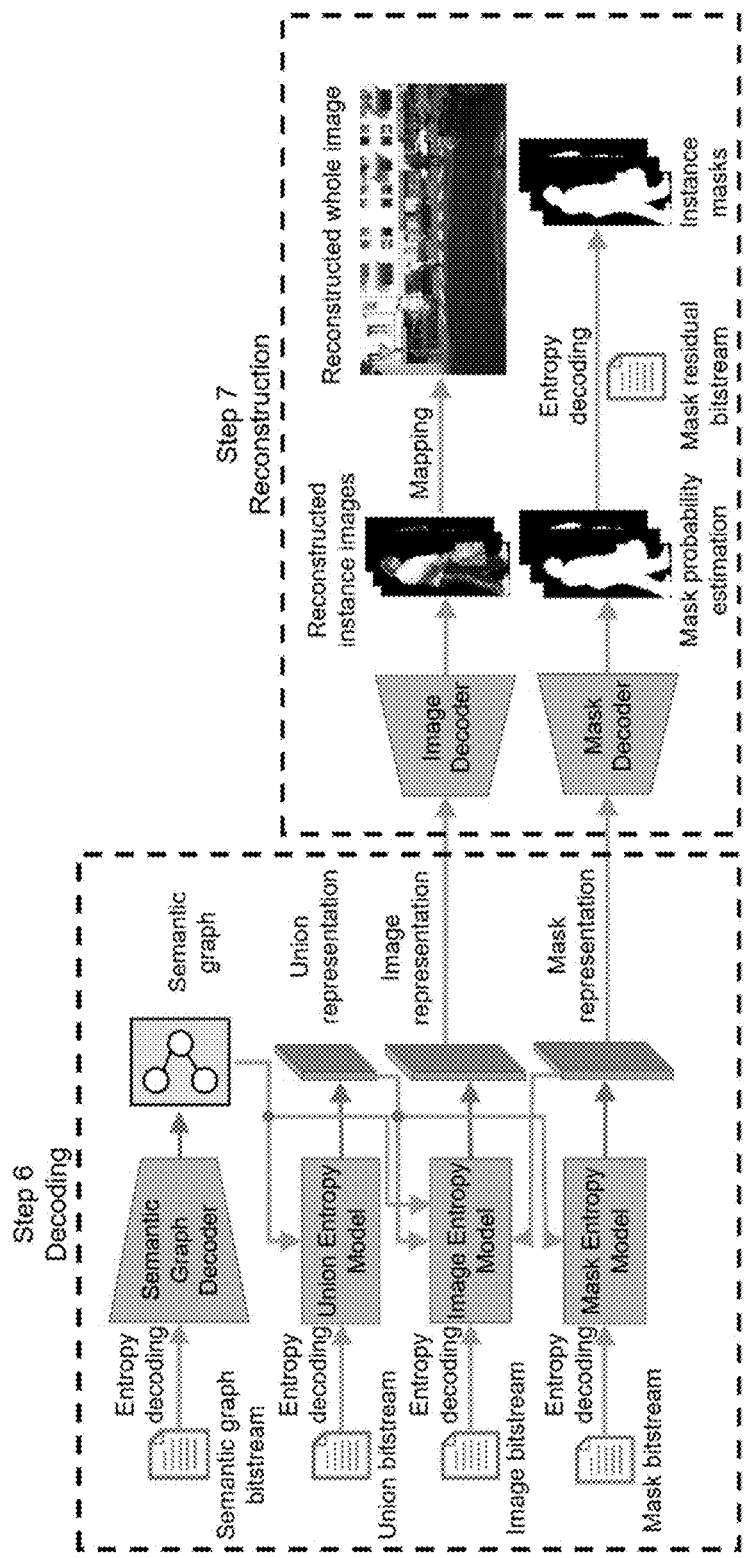
FIG. 2 is the decoding diagram of this invention.
Figure 3:
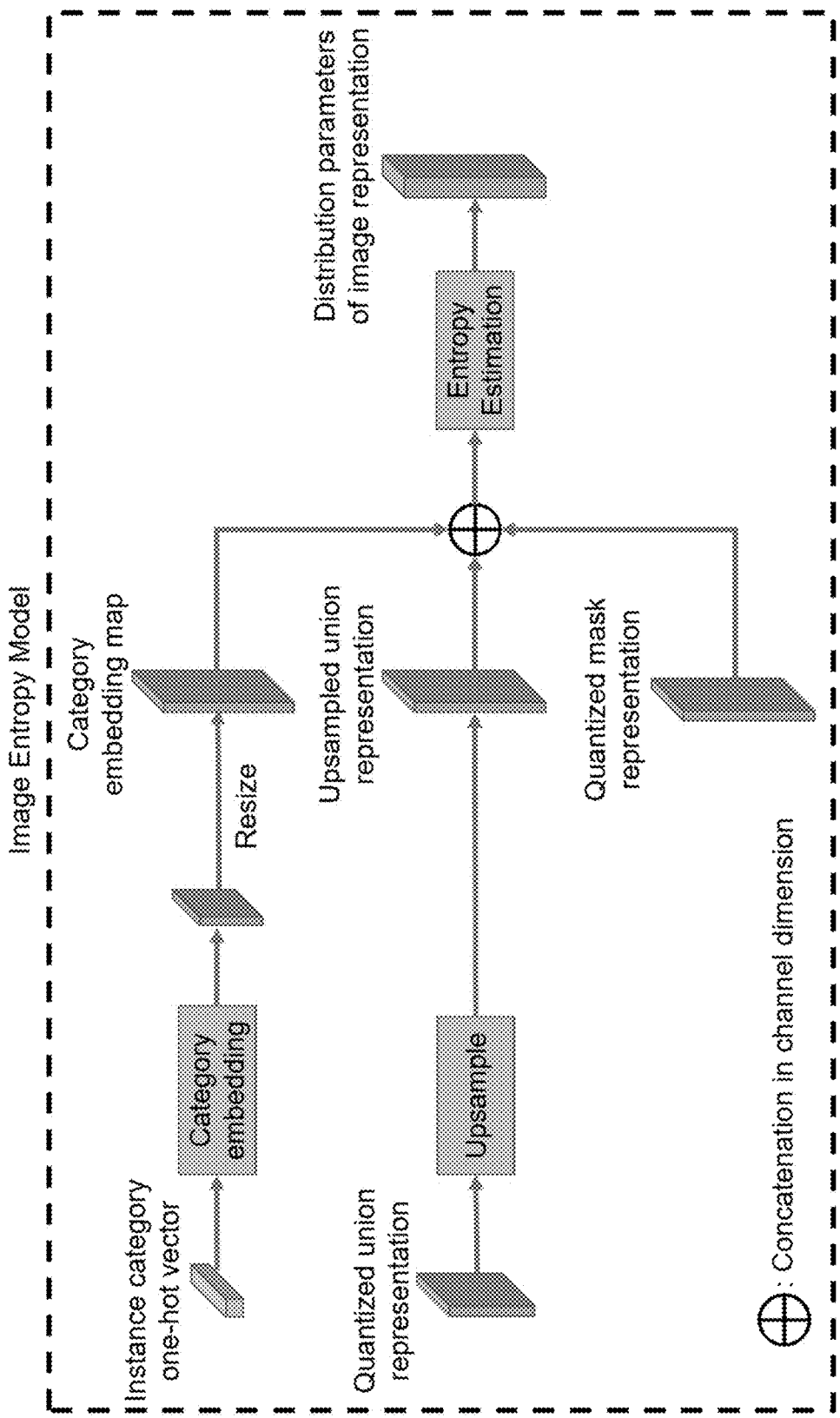
FIG. 3 shows the structure of the image entropy model.

As shown in FIGS. 1 and 2, this invention relates to an end-to-end instance-separable semantic-image joint compression system, which includes: image encoder and decoder, mask encoder and decoder, union encoder, embedding extraction module, semantic graph encoder and decoder, entropy coding module, union entropy model, image entropy model and mask entropy model. Specifically, the image encoder takes the instance image as input and uses a neural network with 16 times spatial downsampling to obtain image representations; The mask encoder takes the instance mask as input and uses a neural network with 16 times spatial downsampling to obtain mask representations; The union encoder takes both image representations and mask representations as inputs, and uses a neural network with spatial downsampling of 4 times to obtain union representations; The embedding extraction module takes union representations as input and uses a neural network with channel dimensionality reduction of 128 times to obtain the union embedding of instance image and mask. The union embeddings of all instances are quantized and embed into a semantic graph; The semantic graph is a graph composed of nodes and edges, where nodes represent instances in the image, whose attribute includes bounding box, class and instance union embedding. Edges represent the relationship between instances. The semantic graph encoder and decoder compress and recover the semantic graph losslessly, respectively; The union entropy model takes union embeddings as input and uses a neural network with channel dimensionality increased by 128 times to estimate the probability distribution of the union representation of each instance; The mask entropy model takes the union representation as input and uses a neural network with a spatial dimensionality increase of 4 times to estimate the probability distribution of the mask representation; The image entropy model estimates the probability distribution of the image representation using the semantic graph, the union representation and the mask representation as inputs; The entropy coding module encodes the corresponding representations based on the probability estimated by the entropy model, and obtains their respective bitstreams.

Based on the end-to-end instance-separable semantic-image joint compression system described above, an implementation example including the following steps:

Step 1: Semantic Extraction. As shown in FIG. 1, Mask RCNN is used to extract instance masks from the image, and the bounding box and category of each instance are obtained based on the instance mask. The relationships between objects are extracted from the image using the scene graph generation algorithm introduced in "Kaihua Tang et al.' Unbiased Scene Graph Generation from Biased Training".

Step 2: Instance Separation. To get the image of instances, the whole image is cropped according to bounding boxes and then multiplied by instance masks.

Step 3: Instance Images and Masks Embedding. First extract image and mask representations by image encoder and mask encoder, respectively. Then concatenate the two representations in the channel dimension and input it into the union encoder to obtain the union representation. Finally, the union representation is further downsampled by the embedding extraction module to obtain the union embedding. The union embedding is quantized and embedded into the semantic graph.

This implementation example adopts the image encoder and decoder recorded in "Ballé et al. Variational Image Compression".

The mask encoder adopted in this implementation is the image encoder and decoder in "Cheng et al. Learned Image Compression with Discretized Gaussian Mixture Likelihoods and Attention Modules". The structures of the union encoder, embedding extraction module, and union entropy model are shown in Table 1.

TABLE 1

|  | Union Encoder | Embedding Extraction Module | Union Entropy Model |
| --- | --- | --- | --- |
| Layers | Conv(256, 192, k = 3, s = 1, p = 1) LeakyReLU( ) Conv(192, 192, k = 5, s = 2, p = 2) LeakyReLU( ) Conv(192, 192, k = 5, s = 2, p = 2) | Conv(192, 64, k = 3, s = 1, p = 1) LeakyReLU( ) Conv(64, 2, k = 3, s = 1, p = 1) | Conv(2, 192, k = 3, s = 1, p = 1) LeakyReLU( ) Conv(192, 384, k = 3, s = 1, p = 1) |

Figure 4:
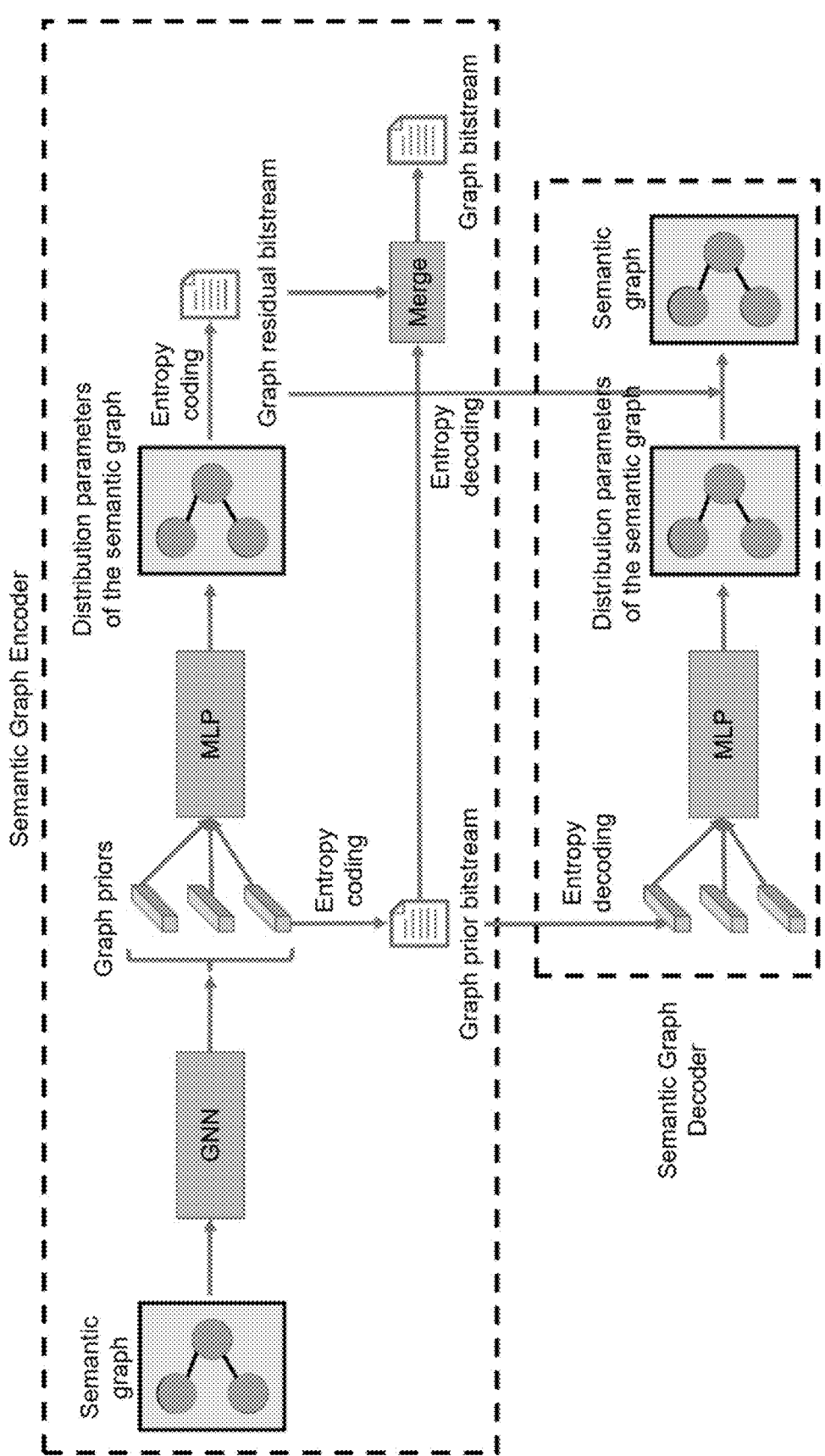
FIG. 4 shows the structure of the semantic graph encoder and decoder.

Step 4: Semantic Graph Losslessly Encoding. The semantic graph codec implemented by this invention is shown in FIG. 4. The semantic graph is first input into a graph convolution network and obtain graph priors, whose number is equivalent to the number of nodes. Then graph priors are quantized and entropy coded into a graph prior bitstream. Finally, based on graph priors, a fully connected network is used to estimate the probability distributions of node features, edge categories and adjacency matrix in the semantic graph, and entropy coding is carried out according to the estimated probabilities. The coded bitstream is called the graph residual bitstream. The combination of graph prior bitstream and graph residual bitstream is referred to as semantic graph bitstream.

Step 5: Image, Mask and Union Representations Encoding. Firstly, input union embeddings in the semantic graph into the union entropy model to estimate the probability distribution of union representations, and then entropy encode quantized union representations to obtain the union stream. Secondly, input the quantized union representation into the mask entropy model to estimate the probability distribution of the mask representation, and then entropy encode the quantized mask representation to obtain the mask bitstream. Thirdly, input the semantic graph, quantized union representation and quantized mask representation into the image entropy model to estimate the probability distribution of the image representation. Then, entropy encoding is performed on the quantized image representation to obtain the image bitstream. In this way, lossy image and mask compression are achieved. When lossless mask compression is required, the mask representation needs to be input into the mask decoder to obtain the probability estimation of the instance mask. Then entropy encoding is performed on the mask itself to obtain the mask residual bitstream. Finally, the generated bitstream includes the semantic graph bitstream, the union bitstream, mask bitstream and image bitstream of each instance, and the mask residual bitstream of each instance.

TABLE 2

Structure of the image entropy model

| | Category Embedding | Union representation upsampling network | Entropy estimation network |
|---|---|---|---|
| Layers | Embedding(81, 1024) | ConvTranspose(192, 192, k = 5, s = 2, p = 2) LeakyReLU( ) ConvTranspose(192, 192, k = 5, s = 2, p = 2) LeakyReLU( ) Conv(192, 256, k = 3, s = 1, p = 1) | Conv(336, 256, k = 1) LeakyReLU( ) Conv(256, 256, k = 1) LeakyReLU( ) Conv(256, 256, k = 1) |

Step 6: Image, Mask and Union Representations Decoding. As shown in FIG. 2, the semantic graph decoder is first exploited to decode the semantic graph bitstream, losslessly recovering the semantic graph. Then the union entropy model takes the union embedding in the semantic graph as input to entropy decode the union bitstream, outputting the quantized union representation. The mask entropy model takes the quantized union representation as input to entropy decode the mask bitstream, outputting the quantized mask representation. Finally, the image entropy model takes the semantic graph, the quantized union representation and the quantized mask representation as input to entropy decode the image bitstream, outputting the quantized image representation.

Figure 5:
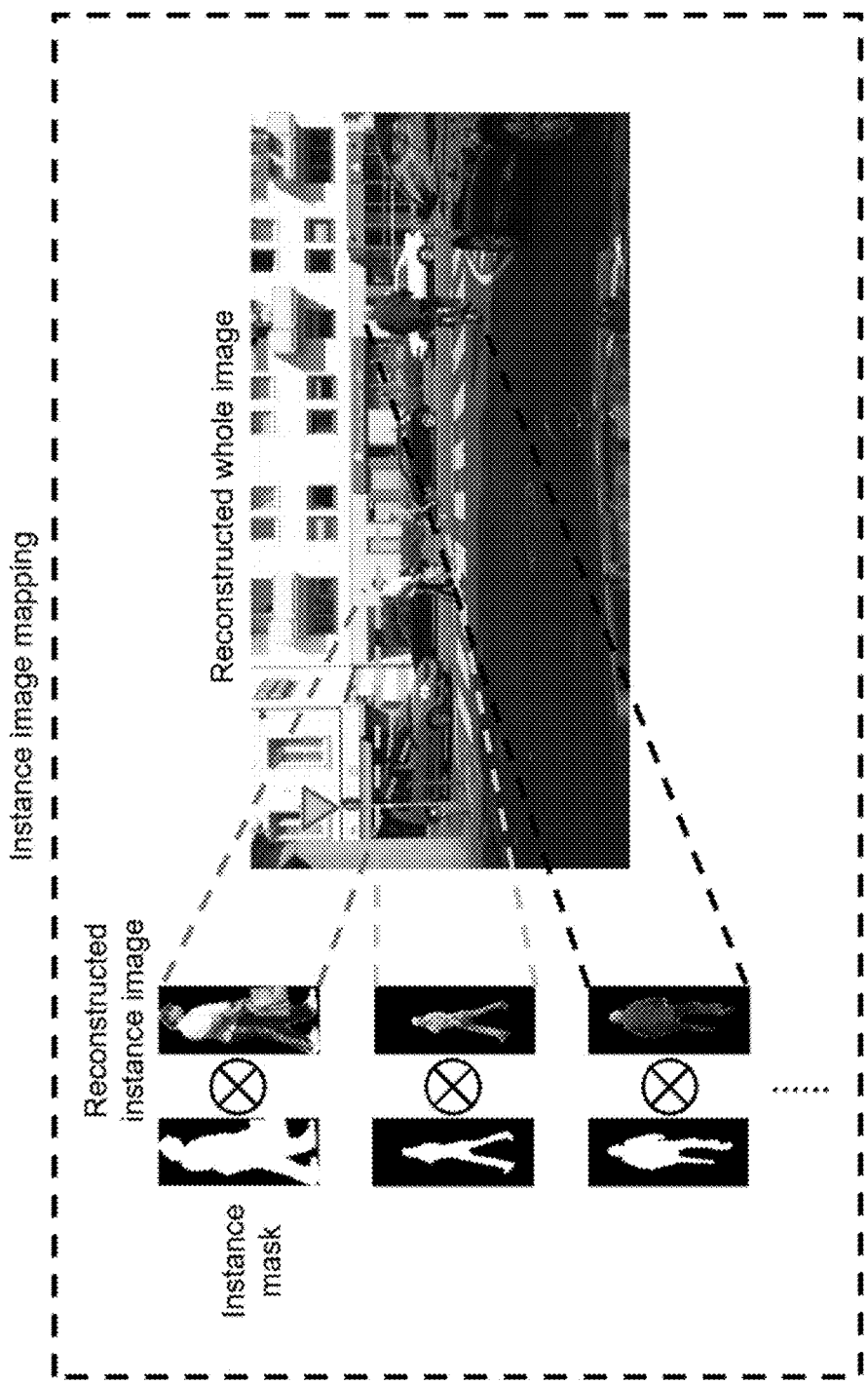
FIG. 5 is the diagram of instance image mapping.

Step 7: Image and Mask Reconstruction. To reconstruct the image, the image decoder takes the quantized image representation of each instance as input and outputs the instance image. Different instance images are mapped into the correct position in the image plane to restore the whole image, as shown in FIG. 5. To reconstruct instance masks, the mask decoder takes the quantized mask representation of each instance as input and outputs the binary probability distribution of the instance mask. The instance mask is losslessly recovered by entropy decoding the mask residual bitstream, according to the estimated binary probability distribution.

Figure 6:
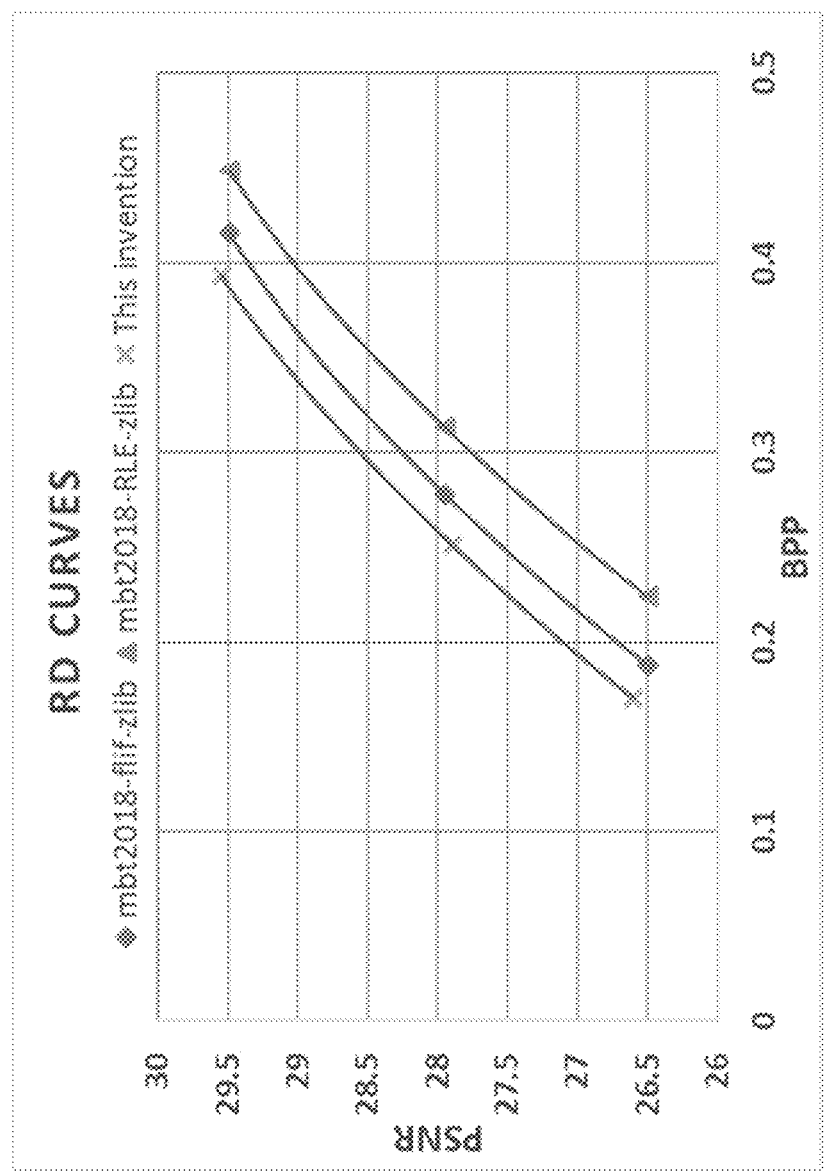
FIG. 6 show experimental results of an implementation of this invention: RD curve comparison of this invention and existing methods.

Experiments are conducted on the MSCOCO dataset to compare this invention with existing state-of-the-art methods that independently compress image, instance mask and other semantics with experimental environment of Ubuntu 18.04, Python 3.7, Pytorch 1.8.0, and Compressai 1.2.0. The present invention reduces the bit rate by more than 20% when the image quality is the same, as shown in FIG. 6. Due to the lossless compression of the semantic graph and instance mask in the present invention, only the image is lossy compressed. Therefore, this invention uses the bitrate of all data as the horizontal axis, and the PSNR of the image as the vertical axis to draw the rate-distortion curve. For independent image and semantic compression methods and the image compression part of this invention, the image compression backbone introduced in "Ballé et al. Variational Image Compression" is adopted. In FIG. 6, RLE and zlib are commonly used instance mask compression method and semantic compression method, respectively.

Figure 7:
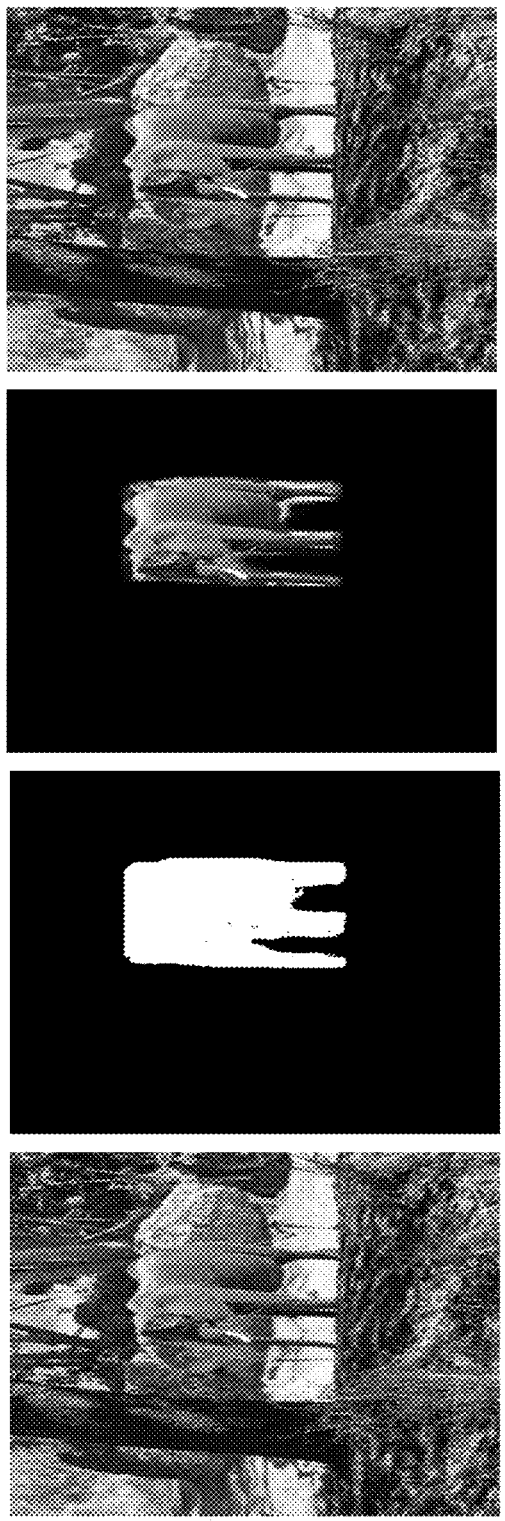
FIG. 7 show experimental results of an implementation of this invention: from left to right: original image, reconstructed instance mask, reconstructed instance image, reconstructed whole image.

As shown in FIG. 6, compared to the combination of variational image compression, RLE, and zlib, the bit rate of this invention is reduced by more than 20% under the same image quality. Compared to the most advanced methods, namely variational image compression, FLIF and zlib, the present invention can also achieve improvements. In addition, the present invention supports instance-separable coding of images and semantics, as shown in FIG. 7. For example, when the decoder side only requires the instance of "elephant", the present invention allows for the transmission and decoding of bitstreams exactly corresponding to the elephant. Specifically, the bit rate for fully decoding all data is 0.283, while the bit rate for elephants is only 0.09, resulting in a bit rate saving of 68%.

The specific implementation mentioned above can be partially adjusted by technical personnel in the art in different ways without departing from the principles and purposes of the present invention. The scope of protection of the present invention is subject to the claims and is not limited by the specific implementation mentioned above. Each implementation method within its scope is bound by the present invention.

What is claimed is:

1. An end-to-end instance-separable semantic-image joint compression system comprises of: image encoder and decoder, mask encoder and decoder, union encoder, embedding extraction module, semantic graph encoder and decoder, entropy coding module, union entropy model, image entropy model and mask entropy model, and the image encoder takes an instance image as input and uses a neural network with 16 times spatial downsampling to obtain image representations, and the mask encoder takes an instance mask as input and uses a neural network with 16 times spatial downsampling to obtain mask representations, and an union encoder takes both image representations and mask representations as inputs, and uses a neural network with spatial downsampling of 4 times to obtain union representations, and the embedding extraction module takes union representations as input and uses a neural network with channel dimensionality reduction of 128 times to obtain a union embedding of instance image and mask; the union embeddings of all instances are quantized and embed into a semantic graph, and the semantic graph encoder and decoder compress and recover the semantic graph losslessly, respectively, and the union entropy model takes union embeddings as input and uses a neural network with channel dimensionality increased by 128 times to estimate a probability distribution of the union representation of each instance, and the mask entropy model takes the union representation as input and uses a neural network with a spatial dimensionality increase of 4 times to estimate a probability distribution of the mask representation, and the image entropy model estimates a probability distribution of the image representation using the semantic graph, the entropy coding module takes the union representation and the mask representation as inputs and encodes the corresponding representations based on the probabilities estimated by the entropy model, and obtains bitstreams that includes a semantic graph bitstream, a union bitstream, a mask bitstream and an image bitstream.

2. The end-to-end instance-separable semantic-image joint compression system according to claim 1, comprises the following steps:
step 1) semantics including instance masks, bounding boxes, and relations are first extracted from an input image, and according to the extracted bounding boxes and instance masks, the image is separated into instance images, and the representations of instance images and masks are extracted through the image encoder and mask encoder, and input into the union encoder to obtain union representations; the embedding extraction module downsamples and quantizes the union representation into a union embedding, and embeds it into the semantic graph;

step 2) encode the semantic graph and various representations to obtain the bitstreams, including:
(a) input the semantic graph into the semantic graph encoder for lossless compression, obtaining the semantic graph bitstream;
(b) extract instance union embeddings from the semantic graph, input them into the union entropy model to estimate the probability distribution of union representations, and then entropy encode quantized union representations to obtain the union bitstream;
(c) input the quantized union representation into the mask entropy model to estimate the probability distribution of the mask representation, and then entropy encode a quantized mask representation to obtain the mask bitstream; input the semantic graph, quantized union representation and quantized mask representation into the image entropy model to estimate the probability distribution of the image representation, and entropy encoding is performed on a quantized image representation to obtain the image bitstream, and in this way, lossy image and mask compression are achieved.

3. The end-to-end instance-separable semantic-image joint compression system according to claim 2, wherein the image and mask representations are obtained through the following way: $y_I = IE(x_I)$, $y_M = ME(x_M)$, where $x_I$ and $x_M$ are instance image and mask, respectively, IE is the image encoder, ME is the mask encoder, $y_I$ and $y_M$ are representations of the image and mask, respectively, $x_I \in R^{3 \times H \times W}$, $x_M \in R^{1 \times H \times W}$, $$y_I \in R^{C \times \frac{H}{16} \times \frac{W}{16}}, y_M \in R^{\frac{C}{3} \times \frac{H}{16} \times \frac{W}{16}},$$

and
the union representation is obtained through the following way: $z = UE(cat(y_I, y_M))$, where $cat(\cdot)$ is concatenation on channels, $UE(\cdot)$ is the union encoder and $$z \in R^{C \times \frac{H}{64} \times \frac{W}{64}}$$

is the union representation, and
the union embedding is obtained by: $e = q(SE(z))$, where $SE(\cdot)$ is the embedding extraction module, $q(\cdot)$ is quantization, $$e \in R^{\frac{C}{128} \times \frac{H}{64} \times \frac{W}{64}}$$

is the union embedding.

4. The end-to-end instance-separable semantic-image joint compression system according to claim 2, wherein a lossless mask compression is required, the mask representation needs to be input into the mask decoder to obtain the probability distribution of the instance mask, and the entropy encoding is performed on the instant mask itself to obtain a mask residual bitstream.

5. The end-to-end instance-separable semantic-image joint compression system according to claim 2, wherein an union entropy estimation performed by the union entropy model is: $\mu_2$, $\sigma_2 = EntropyEstimate_2(e)$, $\hat{p}(\hat{z}) \sim N(\mu_2, \sigma_2^2)$, where e is the union embedding of an instance, $\hat{z}$ is the quantized union representation, $EntropyEstimate_2$ is the union entropy model, $\mu_2$, $\sigma_2$ are parameters of Gaussian distribution, and the Gaussian distribution constructed based on $\mu_2$, $\sigma_2$ is used to estimate a probability of the quantized union representation, namely, $\hat{p}(\hat{z})$, and
a mask entropy estimation performed by the mask entropy model is: $\mu_1^M$, $\sigma_1^M = EntropyEstimate_1^M(\hat{z})$, $\hat{p}(\widehat{y_M}) \sim N(\mu_1^M, (\sigma_1^M)^2)$, where $\widehat{y_M}$ is the quantized mask representation, $EntropyEstimate_1^M$ is the mask entropy model, $\mu_1^M$, $\sigma_1^M$ are parameters of Gaussian distribution, and the Gaussian distribution constructed based on $\mu_1^M$, $\sigma_1^M$ is used to estimate the probability of quantized mask representation, namely, $\hat{p}(\widehat{y_M})$, and
an image entropy estimation performed by the image entropy model is: $\mu_1'$, $\sigma_1' = EntropyEstimate_1'(c, \hat{z}, \hat{y}_M)$, $\hat{p}(\hat{y}_I) \sim N(\mu_1', (\sigma_1')^2)$, where c is an object category, $EntropyEstimate_1'$ is the image entropy model, $\mu_1'$, $\sigma_1'$, are parameters of Gaussian distribution, and the Gaussian distribution constructed based on $\mu_1'$, $\sigma_1'$ is used to estimate a probability of quantized image representation, namely, $\hat{p}(\hat{y}_I)$.

6. The end-to-end instance-separable semantic-image joint compression system according to claim 5, wherein the instance masks are compressed losslessly, the quantized mask representation of each instance is input into the mask decoder to obtain a probability estimate of the instant mask: $p_0^M$, $p_1^M = MD(\widehat{y_M})$, where MD is the mask decoder, $p_0^M$ and $p_1^M$ are a binary probability estimation of the instant mask and are used to entropy encode the instant mask itself.

7. A decoding method based on the end-to-end instance-separable semantic-image joint compression system of claim 1, comprising the following steps:
step i) the semantic graph decoder is first exploited to decode the semantic graph bitstream, losslessly recovering the semantic graph, and then the union entropy model takes the union embedding in the semantic graph as input to entropy decode the union bitstream, outputting the quantized union representation, and the mask entropy model takes the quantized union representation as input to entropy decode the mask bitstream, outputting the quantized mask representation; finally, the image entropy model takes the semantic graph, the quantized union representation and the quantized mask representation as input to entropy decode the image bitstream, outputting the quantized image representation; and step ii) to reconstruct the image, the image decoder takes the quantized image representation of each instance as input and outputs the instance image; different instance images are mapped into correct positions corresponded to positions in the input image in the image plane to restore the input image, and to reconstruct instance masks, the mask decoder takes the quantized mask representation of each instance as input and outputs the binary probability distribution of the instance mask, and the instance mask is losslessly recovered by entropy decoding the mask residual bitstream, according to the estimated binary probability distribution.

8. The decoding method according to claim 7, wherein the instance image mapping is performed by multiplying reconstructed instance images with the instance mask, and place it back in its cropped position, and assuming there are a total of n instances in the input image, and $\{\widehat{x_I^1}, x_M^1\}$, $\{\widehat{x_I^2}, x_M^2\}, \ldots, \{\widehat{x_I^n}, x_M^n\}$ are the reconstructed instance images and masks corresponding to the $1^{st}, 2^{nd}, \ldots, n^{th}$ instance of the input image, where $\widehat{x_I^i} \in R^{3 \times h_i \times w_i}$, $x_M^i \in R^{1 \times h_i \times w_i}$, Use $bbox_i = (x_B^i, y_B^i, w_i, h_i)$, $i=1, 2, \ldots, n$ to denote the bounding box of the $i^{th}$ instance, where $x_B^i, y_B^i, w_i, h_i$ are coordinates of the bounding box; use $\otimes$ to denote pixel-level multiplication, then the operation can be expressed as: $\widehat{x_I}[:, y_B^i:y_B^i+h_i, x_B^i:x_B^i+w_i] = \widehat{x_I}[:, y_B^i:y_B^i+h_i, x_B^i:x_B^i+w_i] + \widehat{x_I^i} \otimes x_M^i$, where $\widehat{x_I} \in R^{3 \times H \times W}$ is a zero image initially; after the instance image mapping done, $\widehat{x_I}$ is the reconstructed input image.

9. The decoding method according to claim 7, wherein the neural network is trained through loss functions including image reconstruction loss, mask residual bit rate loss, image bit rate loss, mask bit rate loss, union bit rate loss, and semantic graph bit rate loss, and specifically, $L = \lambda \cdot MSE(x_I, \widehat{x_I}) - \log p_{x_M|p_0,p_1}(x_M|p_0, p_1) - \log p_{\widehat{y_I}|\hat{p}(\widehat{y_I})}(\widehat{y_I}|\hat{p}(\widehat{y_I})) - \log p_{\widehat{y_M}|\hat{p}(\widehat{y_M})}(\widehat{y_M}|\hat{p}(\widehat{y_M})) - \log p_{\hat{z}|\hat{p}(\hat{z})}(\hat{z}|\hat{p}(\hat{z})) - \log p_{g|\hat{p}(g)}(g|\hat{p}(g))$, where $\lambda$ is the Laplacian multiplier used to balance bit rate and image reconstruction quality, and the first term in the loss function is image reconstruction loss, while the second is mask residual bit rate loss, the third is image bit rate loss, the forth is mask bit rate loss, the fifth is union bit rate loss, and the last is semantic graph bit rate loss.

* * * * *